E. H. WEBB.
UNIVERSAL JOINT.
APPLICATION FILED DEC. 6, 1919.
1,388,225. Patented Aug. 23, 1921.
2 SHEETS—SHEET 1.
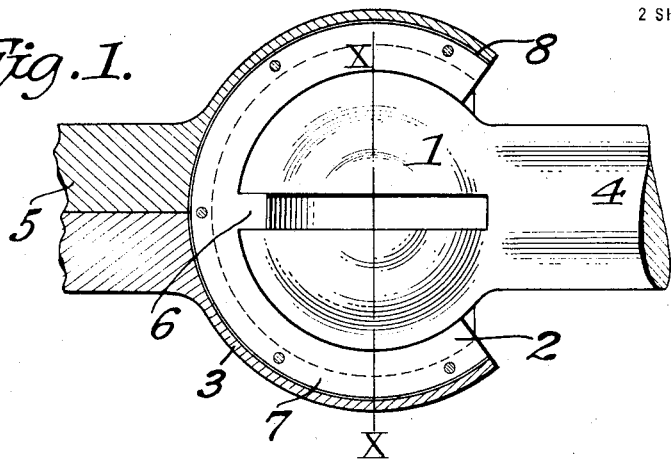
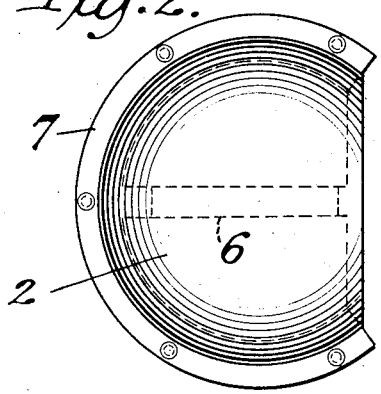
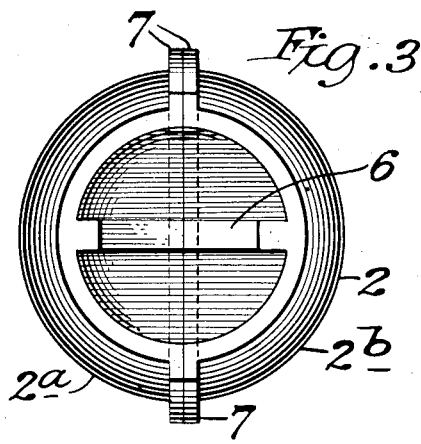
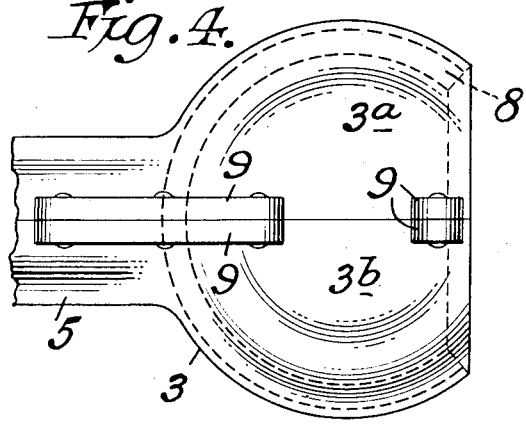
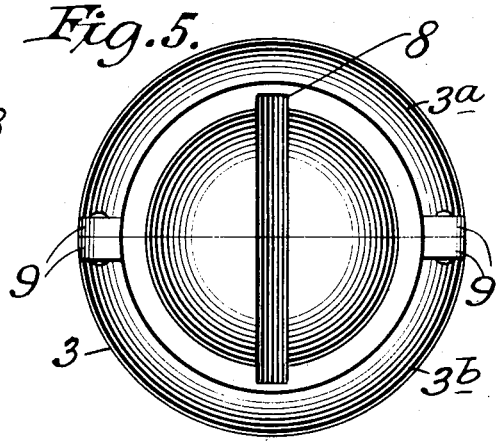
Inventor:
Evert H. Webb.
By Kerr, Page, Cooper & Hayward,
Attorneys.

E. H. WEBB.
UNIVERSAL JOINT.
APPLICATION FILED DEC. 6, 1919.
1,388,225.
Patented Aug. 23, 1921.
2 SHEETS—SHEET 2.
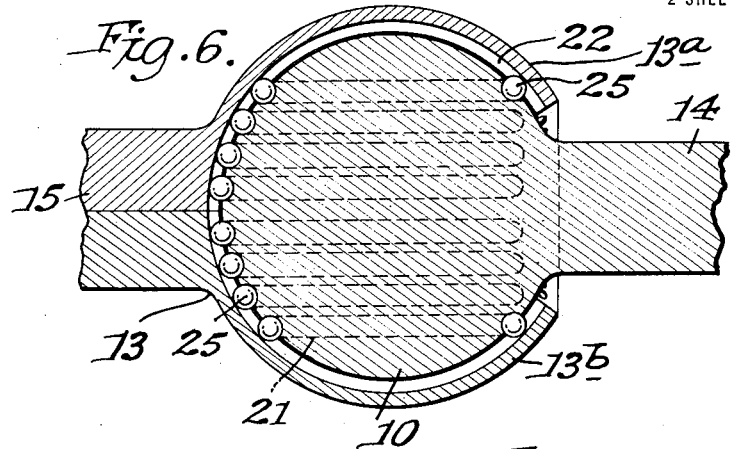
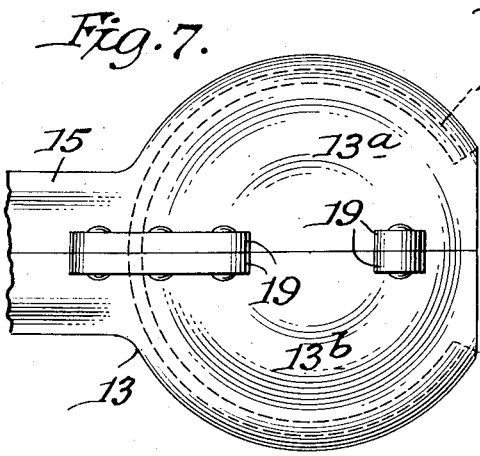
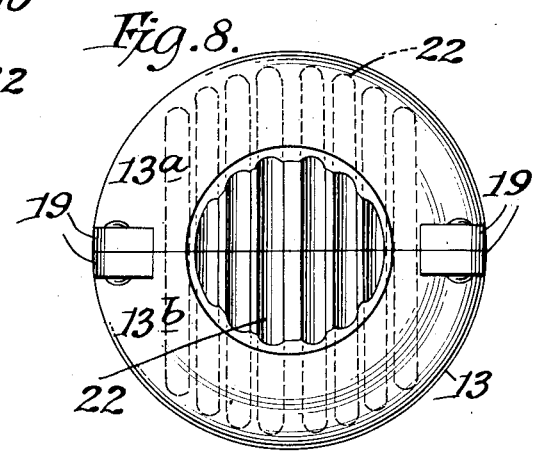
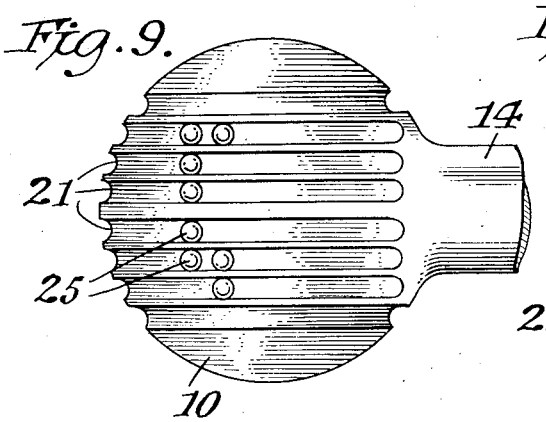
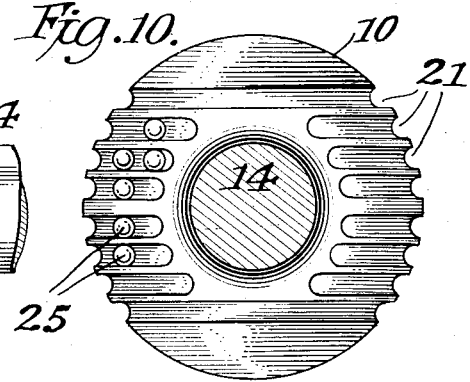
Inventor,
Ernest H. Webb,
By Kerr, Page, Cooper & Hayward,
Attorneys

UNITED STATES PATENT OFFICE.

ERNEST H. WEBB, OF NEW BRUNSWICK, NEW JERSEY.

UNIVERSAL JOINT.

1,388,225.

Specification of Letters Patent.   Patented Aug. 23, 1921.

Application filed December 6, 1919.  Serial No. 343,043.

*To all whom it may concern:*

Be it known that I, ERNEST H. WEBB, a citizen of the United States, residing at New Brunswick, in the county of Middlesex and State of New Jersey, have invented certain new and useful Improvements in Universal Joints, of which the following is a full, clear, and exact description.

This invention relates to universal joints or shaft couplings; *i. e.*, to couplings whereby a torque may be transmitted from one shaft to another and which permits the angle between the axes of said shafts to vary.

One of the principal objects of the invention is to provide a coupling in which the weight of the parts is carried and the end thrust and pull is carried by surfaces other than those which transmit the torque.

Another object is to provide a coupling or joint which is comparatively simple, consisting of a few members or parts which may be easily assembled.

A further object is to provide a shaft coupling in which the torque is transmitted through a series of balls. Other objects and advantages will appear as the invention is hereinafter disclosed.

Referring to the drawings which illustrate what I now consider preferred forms of my invention:

Figure 1 is a longitudinal sectional elevation of one form of universal coupling.

Figs. 2 and 3 are respectively a side and end elevation of the intermediate socket element shown in Fig. 1.

Figs. 4 and 5 are respectively a side and end elevation of the second socket member shown in Fig. 1.

Fig. 6 is a view similar to Fig. 1 but illustrating a modification.

Figs. 7 and 8 are respectively side and end elevations of the socket member shown in Fig. 6.

Figs. 9 and 10 are similar views to Figs. 7 and 8 but illustrate the ball member shown in Fig. 6.

The form of the invention illustrated in Figs. 1 to 5 comprises a ball member 1, an intermediate socket element or member 2, and a second socket member 3. Except where it is joined by the stub shaft 4 the surface of the member 1 is spherical. The member 2 is in the form of a solid bounded by two concentric spherical surfaces of different radii, the lesser radius being only so much greater than the radius of the ball member 1 as is necessary to permit free rotative movement of the latter with respect to the intermediate socket when seated within said member 2. The socket member 3 is provided with a stub shaft 5 and the exterior thereof may be of any desired configuration. The interior surface of the socket member 3 is a spherical surface of radius only so much greater than that of the exterior surface of the member 2 as is necessary to permit free rotative movement of the latter with respect to the socket member 3.

The spherical surfaces, above mentioned do not form complete spheres as an opening must be left for the shaft 4 but in order to cause the end pull as well as the end thrust to be carried by said surfaces the said surfaces are made greater than a hemisphere, as clearly shown in Fig. 1. This necessitates some arrangement whereby the parts may be assembled. Furthermore, the joint as thus far described is incapable of transmitting torque. In order to permit assembly of the parts and to provide torque transmitting means the structure illustrated in Figs. 1 to 5 may be employed. The socket element 2 is provided with an inwardly projecting key 6 adapted to seat in a key-way formed in the ball member 1. This key and its key-way are arc-shaped and so designed as to permit relative movement of the members 1 and 2 about the axis X—X passing through the center of the ball 1 but all other relative movement of said members 1 and 2 is prevented either by the key and key-way or by the spherical bearing surfaces of said members. The member 2 is constructed of two symmetrical sections $2^a$ and $2^b$ which abut on a plane normal to the plane of the key 6. Any suitable means may be provided for securing the sections $2^a$, $2^b$ together after the ball 1 has been entered in the socket. Thus each section may be provided with a flange, the flanges 7, 7, being riveted together. By countersinking the rivets the flanges 7, 7, may be employed as a key to enter a key-way 8 in the socket member 3. It will be noted that the key 7 will permit relative movement of the members 2, 3, about an axis at right angles to the axes X—X and of the shaft 5 but all other relative movement of said members 2, 3 is prevented. For the purpose of assembly the member 3 is constructed of two symmetrical sections $3^a$, $3^b$ joined by riveting flanges 9, 9 together after the member 2 is entered.

The stub shafts 4 and 5 may be connected to other shafts by any suitable means. Either of the shafts 4, 5 may constitute the driving element and the other the driven element. The driving shaft will transmit torque to the driven shaft through the keys and key-ways through a wide variation of the angles between the axes of said shafts. It will be noted that the large spherical bearing surfaces between the members 1, 2 and 3 not only assume the load, or a major portion of the load, due to the weight of the parts but also carry the end thrust and prevent pulling apart of the shafts. Furthermore the sections $2^a$, $2^b$ being symmetrical, as are also the sections $3^a$, $3^b$, there are but three different parts to manufacture in constructing the coupling.

The keys 6 and 7 may each be replaced by one or more series of balls in which event the socket-element 2 may be dispensed with. In Figs. 6 to 10 I have shown a form of universal shaft coupling in which the ball member 10 is provided with a plurality of peripheral grooves 21 forming race-ways. The planes of these grooves are parallel to each other, and to the axis of the stub shaft 14. The socket member 13, composed of two symmetrical sections $13^a$, $13^b$, joined by rivets at the flanges 19, 19, is also provided with a series of grooves 22 forming race-ways. The planes of the grooves 22 are parallel to each other and to the axis of the stub shaft 15. By making the radius of the inner spherical surface of the socket member 13 greater than the radius of the spherical surface of the ball member 10 only by an amount sufficient to permit relative rotation of said members 10 and 13, large bearing surfaces are provided for assuming a large portion of the load other than the driving torque. Driving torque may be transmitted from one of the shafts 14, 15 to the other through a plurality of balls mounted as hereinafter described.

One method of assembling the last mentioned form of the invention is as follows: A plurality of balls 25 are mounted in the grooves 21, the number of balls in each groove corresponding to the number of grooves 22 in the socket member 13. These balls should be spaced as nearly as practicable in a series of parallel rows, each row being at right angles to the grooves 21 and each row being spaced from its adjacent row by an amount equal to the distance between adjacent grooves 22 of the socket member. While a cage might be provided to hold the balls 25 in this relative arrangement I prefer to hold them in position temporarily by means of a heavy grease. The two separate sections $13^a$, $13^b$, may then be placed around the ball member 10 with the grooves 21. There will then be a ball 25 at each intersection of a groove 22 with a groove 21 and the flanges 19 may thus be riveted together. It will be obvious to those skilled in the art that rotation of one of the shafts 14, 15 will cause rotation of the other, the driving torque being transmitted through the balls 25. Furthermore, the angle between the axes of the said shafts may be varied considerably without in any way disturbing the transmission of this torque.

It will be appreciated that the invention is susceptible to further modification. For example, instead of employing a ball 25 at each intersection of race-ways the number of balls may be materially reduced. Thus a ball 25 may be placed only at each of those intersections which in diametrically opposed by another intersection. In this way the thrust due to the tendency of the balls 25 to hop out of the race-ways, when acting as keys, is counterbalanced.

What I claim is:—

1. A universal shaft coupling comprising in combination, a ball member, a socket member therefor, the outer surface of said ball member being provided with race-ways, and the inner surface of said socket member being provided with race-ways which intersect the first mentioned race-ways, and balls at the intersection of at least some of said race-ways.

2. A universal shaft coupling comprising in combination, a driving member and a driven member one of which at least partially surrounds the other, the inner surface of the outer member being provided with a race-way and the outer surface of the inner member being provided with a plurality of race-ways which intersect the first mentioned race-way, and a plurality of balls in said first mentioned race-way and each lying in a corresponding one of said race-ways which intersect the first mentioned race-way.

3. A universal shaft coupling comprising in combination, a driving member and a driven member one of which at least partially surrounds the other, the outer surface of the inner member being provided with a race-way and the inner surface of the outer member being provided with a plurality of race-ways which intersect the first mentioned race-way, and a plurality of balls in said first mentioned race-way and each lying in a corresponding one of the said race-ways which intersect the first mentioned race-way.

4. A universal shaft coupling comprising in combination, a driving member and a driven member one of which at least partially surrounds the other, the inner surface of the outer member being provided with a plurality of race-ways and the outer surface of the inner member being provided with a plurality of race-ways which intersect the first mentioned race-ways, and balls at the intersection of at least some of said race-ways, each of said race-ways containing a plurality of such balls.

In testimony whereof I hereunto affix my signature.

ERNEST H. WEBB.